United States Patent [19]

Finlayson

[11] 4,450,095

[45] May 22, 1984

[54] ORGANOPHILIC CLAY GELLANT HAVING ENHANCED DISPERSIBILITY

[75] Inventor: Claude M. Finlayson, Houston, Tex.

[73] Assignee: NL Industries, Inc., New York, N.Y.

[21] Appl. No.: 207,544

[22] Filed: Nov. 17, 1980

[51] Int. Cl.³ ............................................. B01J 13/00
[52] U.S. Cl. ................................ 252/315.2; 106/38.7; 106/287.17; 252/8.5 M; 252/8.5 P; 252/8.55 R; 252/28; 252/309; 252/DIG. 8; 524/236
[58] Field of Search .................. 260/448 C; 252/316, 252/309 B, 8.5 P, 28, 315.2; 524/236

[56] References Cited

U.S. PATENT DOCUMENTS

| | | | |
|---|---|---|---|
| 2,033,856 | 3/1936 | Smith | 546/10 |
| 2,355,356 | 8/1944 | Young, Jr. | 564/490 |
| 2,531,427 | 11/1950 | Hauser | 260/448 C |
| 2,531,440 | 11/1950 | Jordan | 252/28 |
| 2,548,679 | 4/1951 | Olin | 564/285 |
| 2,622,987 | 12/1952 | Ratcliffe | 252/316 X |
| 2,658,869 | 11/1953 | Stross et al. | 252/28 |
| 2,677,661 | 5/1954 | O'Halloran | 252/49.6 |
| 2,739,067 | 3/1956 | Ratcliffe | 106/30 |
| 2,750,296 | 6/1956 | Curado et al. | 106/30 |
| 2,754,219 | 7/1956 | Voet et al. | 106/32 |
| 2,767,177 | 10/1956 | Erickson | 544/64 |
| 2,775,617 | 12/1956 | Shapiro et al. | 564/296 |
| 2,859,234 | 11/1958 | Clem | 260/448 C |
| 2,885,360 | 5/1959 | Haden, Jr. et al. | 252/28 |
| 2,966,506 | 12/1960 | Jordan | 260/448 C |
| 3,133,072 | 5/1964 | Shibe, Jr. et al. | 252/316 X |
| 3,136,819 | 6/1964 | Shapiro et al. | 564/473 |
| 3,461,163 | 8/1969 | Boothe | 564/296 |
| 3,472,740 | 10/1969 | Boothe | 203/37 |
| 3,537,994 | 11/1970 | House | 252/28 X |
| 3,929,849 | 12/1975 | Oswald | 260/448 C |
| 3,945,836 | 3/1976 | Miyata | 106/22 |
| 3,974,125 | 8/1976 | Oswald et al. | 523/216 |
| 4,054,537 | 10/1977 | Wright et al. | 423/331 |
| 4,097,437 | 6/1978 | Dhake | 524/236 |
| 4,105,578 | 8/1978 | Finlayson et al. | 252/316 |
| 4,116,866 | 9/1978 | Finlayson | 252/315.2 |
| 4,287,086 | 9/1981 | Finlayson et al. | 252/316 |
| 4,317,737 | 3/1982 | Oswald et al. | 252/28 |

FOREIGN PATENT DOCUMENTS

1106281 3/1968 United Kingdom .
1592271 7/1981 United Kingdom .

*Primary Examiner*—Richard D. Lovering
*Attorney, Agent, or Firm*—Burns, Doane, Swecker & Mathis

[57] ABSTRACT

The viscosity of liquid organic systems is increased by adding thereto an organophilic clay gellant which is the reaction product of a smectite-type clay having a cation exchange capacity of at least 75 milliequivalents per 100 grams of said clay and from 100 to 120 milliequivalents per 100 grams of clay of methyl or benzyl trialkyl ammonium salt, wherein the alkyl groups independently contain from 14 to 20 carbon atoms.

6 Claims, No Drawings

ORGANOPHILIC CLAY GELLANT HAVING ENHANCED DISPERSIBILITY

This invention relates to organophilic organic-clay complexes which are dispersible in organic liquids to form a gel therein. Depending on the composition of the gel, such gels may be useful as lubricating greases, oil base muds, oil base packer fluids, paint-varnish-lacquer removers, paints, foundry molding sand binders and the like.

It is well known that organic compounds which contain a cation will react under favorable conditions by ion-exchange with clays which contain a negative layer-lattice and exchangeable cations to form organophilic organic-clay products. If the organic cation contains at least one alkyl group containing at least 10 carbon atoms, then such organoclays have the property of swelling in certain organic liquids. See for Example U.S. Pat. No. 2,531,427 and U.S. Pat. No. 2,966,506, both incorporated herein by reference, and the book "Clay Mineralogy", 2nd Edition, 1968 by Ralph E. Grim (McGraw-Hill Book Co., Inc.), particularly Chapter 10, Clay-Mineral-Organic Reactions; pp. 356–368-Ionic Reactions, Smectite; and pp. 392–401-Organophilic Clay-Mineral Complexes.

Since the commercial introduction of these organoclays in the early 1950's (trademarked BENTONE, a product of NL Industries, Inc.), it has become well known to gain the maximum gelling (thickening) efficiency from these organoclays by adding a low molecular weight polar organic material to the composition. Such polar organic materials have been variously called dispersants, dispersion aids, solvating agents, dispersion agents and the like. See for example the following U.S. Pat. Nos.: O'Halloran U.S. Pat. No. 2,677,661; McCarthy et al. U.S. Pat. No. 2,704,276; Stratton U.S. Pat. No. 2,833,720; Stratton U.S. Pat. No. 2,979,229; Stansfield et al. U.S. Pat. No. 3,294,683.

It is disclosed in U.S. Pat. No. 3,753,906 that water is a dispersant when used in a heated grease preparation process. U.S. Pat. No. 3,654,171, however, discloses that water is not a dispersant in grease preparation processes conducted at a temperature ranging from ambient to about 220° F. (104.44° C.). These polar materials may also affect properties other than the viscosity or gel strength of the organic gels, such as mechanical stability, thixotropy, and storage stability.

The most efficient and accepted polar materials for use as dispersants have been found to be low molecular weight alcohols and ketones, particularly methanol and acetone. These dispersants, however, have very low flash points and require the use of flameproof apparatus. Higher boiling, high flash point dispersants may be used but these are less efficient and often produce gels having poor secondary properties such as mechanical stability or storage stability.

U.S. Pat. No. 3,537,994 to R. House discloses the use of organophilic clays prepared from methyl benzyl dihexadecyl ammonium compounds as gellants for lubricating greases. All of the examples in this patent disclose the use of a polar organic dispersant for the organophilic clay in the preparation of the greases.

Accordingly, there is a need for an organophilic clay gellant which is easy to disperse in organic systems and which requires no dispersant, other than perhaps minor quantities of water, for gelling organic systems.

An organophilic clay gellant having enhanced dispersibility in organic systems has been unexpectedly discovered comprising the reaction product of a methyl trialkyl ammonium compound and a benzyl trialkyl ammonium compound, wherein the alkyl groups have from 14 to 20 carbon atoms and a smectite-type clay having a cation exchange capacity of at least 75 milliequivalents per 100 grams of said clay, and wherein the amount of said ammonium compound is from 100 to 120 milliequivalents per 100 grams of said clay, 100% active clay basis. Preferably the compound contains 20 to 35% alkyl groups having 16 carbon atoms and 60% to 75% alkyl groups having 18 carbon atoms. A similar reaction product containing methyl benzyl dialkyl ammonium compound is defined in U.S. Pat. No. 4,105,578 patented Aug. 8, 1978.

The clays used to prepare the organoclay thickeners of this invention are smectite-type clays which have a cation exchange capacity of at least 75 milliequivalents per 100 grams of clay. Particularly desirable types of clay are the naturally occurring Wyoming variety of swelling bentonite and like clays, and hectorite a swelling magnesium-lithium silicate clay.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively the clay can be mixed with water and a soluble sodium compound such as sodium carbonate, sodium hydroxide, etc., and shearing the mixture such as with a pugmill or extruder.

Smectite-type clays prepared synthetically by either a pneumatolytic or, preferably, a hydrothermal synthesis process can also be used to prepare these novel organic clay complexes. Representative of such clays are the following:

Montmorillonite $[(Al_{4-x}Mg_x)\ Si_8O_{20}(OH)_{4-f}F_f]x\ R^+$ where $0.55 \leq X \leq 1.10$, $f \leq 4$ and R is selected from the group consisting of Na, Li, $NH_4$, and mixtures thereof;

Bentonite $[(Al_{4-x}Mg_x(Si_{8-y}Al_y)O_{20}(OH_{4-f}F_f](x+y)\ R^+$ where $0 < x < 1.10$, $0 < y < 1.10$, $0.55 \leq (x+y) \leq 1.10$, $f \leq 4$ and R is selected from the group consisting of Na, Li, $NH_4$, and mixtures thereof;

Beidellite $[(Al_{4+y})\ (Si_{8-y}Al_y)O_{20}(OH)_{4-f}F_f]x\ R^+$ where $0.55 \leq X \leq 1.10$, $0 \leq y \leq 0.44$, $f \leq 4$ and R is selected from the group consisting of Na, Li, $NH_4$, and mixtures thereof;

Hectorite $[(Mg_{6-x}Li_x)Si_8O_{20}(OH)_{4-f}F_f]x\ R^+$ where $0.57 \leq X \leq 1.15$, $f \leq 4$ and R is selected from the group consisting of Na, Li, $NH_4$, and mixtures thereof;

Saponite $[(Mg_{6-y}Al_y)\ (Si_{8-x-6}Al_{x+y})O_{20}(OH)_{4-f}F_f]x\ R^+$ where $0.58 \leq X \leq 1.18$, $0 \leq y \leq 0.66$, $f \leq 4$ and $R^+$ is selected from the group consisting of Na, Li, $NH_4$, and mixtures thereof;

Stevensite $[(Mg_{6-x}Al_y)Si_8O_{20}(OH)_{4-f}F_f]2 \times R^+$ where $0.28 \leq X \leq 0.57$, $f=4$ and R is selected from the group consisting of Na, Li, $NH_4$, and mixtures thereof.

These clays may be synthesized hydrothermally by forming and aqueous reaction mixture in the form of a slurry containing mixed hydrous oxides or hydroxides of the desired metals with or without, as the case may be, sodium (or alternate exchangeable cation or mixture thereof) fluoride in the proportions defined by the above formulas and the preselected values of x, y and f for the particular synthetic smectite desired. The slurry is then placed in an autoclave and heated under autogenous pressure to a temperature within the range of approximately 100° to 325° C., preferably 275° to 300° C., for a sufficient period of time to form the desired product. Formulation times of 3 to 48 hours are typical at 300° C., depending on the particular smectite being synthesized, and the optimum time can readily be determined by pilot trials. Representative hydrothermal processes for preparing synthetic smectites are described in the following U.S. Pat. Nos., incorporated herein by reference: Granquist U.S. Pat. No. 3,252,757; Neumann U.S. Pat. No. 3,586,478; Orelemann U.S. Pat. No. 3,666,407; Neumann U.S. Pat. No. 3,671,190; Hickson U.S. Pat. No. 3,844,978; Hickson U.S. Pat. No. 3,844,979; Granquist U.S. Pat. No. 3,852,405; Granquist U.S. Pat. No. 3,855,147.

The cation exchange capacity of the smectite-type clay can be determined by the well known ammonium acetate method.

The organic compounds useful in the practice of this invention are quaternary ammonium salts containing one methyl radical, or one benzyl radical, and a mixture of trialkyl radicals having from 14 to 20 carbon atoms, preferably, wherein 20 to 35% have 16 carbon atoms and 60 to 75% have 18 carbon atoms, 100% basis. The salt anion is preferably selected from the group consisting of chloride and bromide, and mixtures thereof, and is more preferably chloride, although other anions such as acetate, hydroxide, nitrite, etc., may be present in the quaternary ammonium salt to neutralize the quaternary ammonium cation. The methyl, or benzyl trialkyl ammonium salt may be represented by the formula:

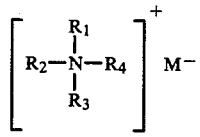

where $R_1 = CH_3$, or $C_6H_5CH_2$; $R_2$, $R_3$ and $R_4$ are alkyl groups containing 14 to 20 carbon atoms and mixtures thereof based on 100%; and where $M^-$ is preferably selected from the group consisting of $Cl^-$, $Br^-$, $NO_2^-$, $OH^-$, $C_2H_3O_2^-$, and mixtures thereof.

The preferred quaternary amine for use in the practice of this invention is methyl or benzyl trihydrogenated tallow ammonium chloride. Commercially prepared hydrogenated tallow typically analyzes 2.0% $C_{14}$, 0.5% $C_{15}$, 29.0%, $C_{16}$, 1.5% $C_{17}$, 66.0%, $C_{18}$ and 1.0% $C_{20}$ alkyl radicals.

The alkyl radicals may be derived from other natural oils including various vegetable oils, such as corn oil, soybean oil, cottonseed oil, castor oil, and the like, as well as various animal oils and fats. The alkyl radicals may be petrochemically derived such as from alpha olefins.

Many processes are known which can be used to prepare methyl or benzyl trialkyl ammonium salts. Generally one skilled in the art would prepare a trialkyl tertiary amine, for example by the hydrogenation of nitriles, and thereafter form the quaternary amine halide by adding benzyl chloride or benzyl bromide to the amine; see Shapiro et al U.S. Pat. Nos. 2,775,617 and 3,136,819.

The organophilic clays of this invention can be prepared by admixing the clay, quaternary ammonium compound and water together, preferably at a temperature within the range from 100° F. (38° C.) to 180° F. (77° C.) for a period of time sufficient for the organic compound to coat the clay particles, followed by filtering, washing, drying and grinding. In using the organophilic clays in emulsions, the drying and grinding steps may be eliminated. When admixing the clay, quaternary ammonium compound and water together in such concentrations that a slurry is not formed, then the filtration and washing steps can be eliminated.

Preferably the clay is dispersed in water at a concentration from about 3% to 7%, the slurry optionally centrifuged to remove non-clay impurities which constitute about 10% to about 50% of the starting clay composition, the slurry agitated and heated to a temperature in the range from 104° F. (60° C.) to 170° F. (77° C.), the quaternary amine salt added in the desired milliequivalent ratio, preferably as a liquid in isopropanol or dispersed in water, and the agitation continued to effect the reaction.

The amount of the methyl or benzyl trialkyl ammonium salt added to the clay for purposes of this invention must be sufficient to impart to the organophilic clay the enhanced dispersion characteristics desired. The milliequivalent ratio is defined as the number of milliequivalents of the organic compound in the organo-clay per 100 grams of clay, 100% active clay basis. The organophilic clays of this invention must have a milliequivalent ratio from 100 to 120. At lower milliequivalent ratios the organophilic clays produced are not effective gellants even though they may be good gellants when dispersed in a conventional manner with polar organic dispersants. At higher milliequivalent ratios the organophilic clays are poor gellants. However, it will be recognized that the preferred milliequivalent ratio within the range from 100 to 120, will vary depending on the characteristics of the organic system to be gelled by the organophilic clay.

The following examples illustrate the composition of this invention and the benefits afforded through the utilization thereof but are not to be construed as limiting the invention except as discussed herein.

The smectite-type clays used are hectorite and Wyoming bentonite. The hectorite clay was slurried in water and centrifuged to remove essentially all of the non-clay impurities. The Wyoming bentonite clay was slurried in water, centrifuged to remove essentially all of the non-clay impurities, and ion-exchanged to the sodium form by passing the slurry through a bed of cation exchange resin in the sodium form.

The conventionally refined oil and the solvent refined oils having the following properties were used in Example 1.

|  | Conventionally Refined | Solvent Refined |
| --- | --- | --- |
| Gravity, °API at 60° F. | 20 | 30.4 |
| Viscosity, SUS at 100° F. | 500 | 400 |
| Viscosity, SUS at 210° F. | 53 | 58 |
| Viscosity Index | 12 | 98 |
| Index of Refraction | 1.5085 | 1.4811 |
| Flash Point °F. | 390 | 460 |
| Pour Point, °F. | −5 | 5 |

EXAMPLE 1

The organophilic clays listed in Table I were prepared by heating the clay slurry to a temperature within the range from 150° F. (66° C.) to 170° F. (77° C.), adding while stirring the clay slurry the indicated amount of the indicated quaternary ammonium chloride which had been previously melted for convenience in handling, and continuing the stirring for approximately 45 minutes, followed by filtering, washing, drying at 140° F. (60° C.), and grinding.

These organophilic clays were evaluated in the conventionally refined oil in the ease of dispersion test which drammatically indicates the improved ease of dispersion of these thickeners as compared to similar organophilic clay thickeners. The data in Table I indicates the ease of dispersion of organophilic clays prepared from methyl or benzyl trihydrogenated tallow ammonium chloride and the smectite-type clays when the amount of this quaternary ammonium compound was in the range of 100 to 120 milliequivalents per 100 grams of clay. The data also illustrates the dispersion characteristics of the inventive organophilic clays as compared with other organophilic clays prepared from somewhat similar but different quaternary ammonium compounds when used in this oil system.

The test is conducted by mixing the organophilic clay with a conventionally refined low VI oil at a concentration of 4.5% by weight for 0.5 minutes using a Fisher Scientific Co. DYNA-MIX ™ 0 mixer operating at 1800 rpm. The viscosity of the oil-gellant mixture is then obtained. Longer mixing times may be undertaken. Thereafter 0.12% water is added to the mixture and the mixing is continued. The viscosity of the mixture is periodically determined, generally after 6–9 minutes. A Brookfield RVT Viscometer is used to obtain the viscosity although any suitable viscometer can be used.

The following examples illustrate the ease of incorporation of the organoclays of the present invention to different paint systems to obtain an improved thickening effect. The ingredients and amounts thereof, used to prepare each composition of Examples 2 thru 12 are summarized in chart form at Tables II, IX and XI. Instructions for mixing the ingredients of the paints of Examples 2 thru 12 are provided at their respective tables.

EXAMPLE 2

Procedure for Low Shear Post Addition of Benzyl Trihydrogenated Tallow Ammonium Bentonite into a Finished Alkyd Enamel Paint (Aliphatic Solvent Type)

The benzyl trihydrogenated tallow ammonium bentonite having an M.E. ratio of 114.1 was post-added under low shear contions into a finished alkyd air dry gloss enamel paint without a polar solvent activator. For comparison, a dimethyl dihydrogenated tallow ammonium bentonite having a M.E. of 95 was also post-added to the enamel at the same shear condition as the test bentonite; however, in this case a mixture of 95% methanol and 5% water was used as a polar solvent activator for the organoclay.

Specifically, 600 grams of a previously prepared alkyd enamel paint (see Table II), not containing a rheological additive, was weighed into a derimmed circular quart can which measures 4 inches in diameter and $4\frac{5}{8}$ inches in height. The paint is agitated using a 1 HP Premier dispersator equipped with a $1\frac{3}{4}$ inch diameter saw toothed Cowles blade. The blade was positioned in the paint at the center of the quart can at a height such that the bottom of the blade is $\frac{1}{2}$ inch above the bottom surface of the can. The shaft speed is held constant at 3,000 rpm. 5.1 grams of the benzyl trihydrogenated tallow ammonium bentonite is slowly shifted into the swirling paint. In the case of the dimethyl dihydrogenated tallow bentonite, 1.7 grams (2.1 cc) of a mixture of 95% methanol and 5% water is also added to the paint exactly one minute after the addition of the organoclay is completed. This polar solvent activator is injected into the paint using a 5 cc glass syringe.

The paint plus organoclay plus, in the case of the comparator organophilic clay, activator is allowed to mix at a shaft speed of 3,000 rpm for a total of 5 minutes. At this time, without stopping the dispersator, a small aliquot of paint is withdrawn from the quart can using a tapered 5 inch stainless steel spatula. This aliquot is used to measure the fineness of dispersion of the paint. This measurement is made using a Hegman fineness of grind gauge calibrated in a scale that ranges from 0 to 8 is equal to a film thickness of zero mils. The grind gauge is a stainless steel block into which a channel of varying depth has been cut out. The paint to be tested is placed into the channel at the deepest end (zero Hegman) and cast down the full length of the channel. The fineness of the grind of the paint is determined on the paint along the channel depth at which the pigment particles are first visible above the surface of the paint film. This measurement is taken after 5, 7, 9, 11, 13 and 15 minutes mixing time. The paints are then transferred to a tin can and allowed to equilibrate overnight at 25° C. before being tested for viscosity and sag.

In addition, the dimethyl dihydrogenated tallow ammonium bentonite was also incorporated into the alkyde gloss enamel using a high shear dispersing procedure which is the normally used procedure for incorporation of these organoclay type thickeners into pigmented coatings. Again the above mentioned polar solvent activator was added to impart the full thickening action of the organoclay to the paint.

In this procedure the dimethyl dihydrogenated tallow ammonium bentonite is added to the millbase of the paint, as indicated on Table II, and dispersed at the shaft speed of 5,400 rpm for a total of 15 minutes.

Viscosity, dispersion and sag measurements for these enamel compositions are given in Table III. The ease of dispersion test is made using a Brookfield RVT model viscometer equipped with a #4 spindle at a spindle speed of 10 rpm. The sag measurements were made with a Leneta anti-sag blade calibrated from 3 to 12 mils. The sag drawdowns were cast into Leneta 7B charts with the aid of a mechanical drive film applicator equipped with a perforated vacuum plate. The completed drawdowns are placed in a vertical position with the paint stripes horizontal, the thinnest (3 mils) stripe at the top. The sag is read, after the paint film has dried, as the thickest paint stripe which does not sag sufficiently to cross into the next stripe of paint below it. Sag units are in mils (0.001 inch).

The table shows that the benzyl trihydrogenated tallow ammonium bentonite post-added to the paint at moderately low shear imparts the same viscosity and sag to the paint and is dispersed to the same fineness as the conventionally employed dimethyl dihydrogenated tallow ammonium bentonite when incorporated into the paint at a significantly higher shear condition. In addition, the dimethyl dihydrogenated tallow ammonium bentonite when incorporated into the paint at the lower shear condition is shown to be decidedly inferior in dispersibility, viscosity build and sag resistance properties compared to the benzyl trihydrogenated tallow ammonium bentonite material incorporated into the paint at the same shear. Thus, the benzyl trihydrogenated tallow ammonium bentonite is a distinct improvement over the conventionally employed organoclay in terms of ease of dispersion, viscosity development and sag control properties.

EXAMPLE 3

Procedure for the Low Shear Post Addition of Methyl Trihydrogenated Tallow Ammonium Bentonite into a Finished Alkyd Enamel Paint (Aliphatic Solvent Type)

The procedures of Example 2 were used in this example except that the organoclay thickener used was the methyl trihydrogenated tallow ammonium bentonite having an M.E. ratio of 116 instead of the benzyl trihydrogenated tallow ammonium bentonite. All other ingredients and amounts were exactly the same as those given in Table II.

The results in the table show that the methyl trihydrogenated tallow ammonium bentonite post-added to the paint at moderately low shear imparts superior viscosity and sag to the paint and is dispersed to almost the same level as the conventionally employed dimethyl dihydrogenated tallow ammonium bentonite when incorporated into the paint at a signficantly higher shear condition. Also, the dimethyl dihydrogenated tallow ammonium bentonite when incorporated into the paint at lower shear condition is shown to be decidedly inferior in dispersibility, viscosity build and sag resistance properties compared to the methyl trihydrogenated tallow ammonium bentonite material incorporated into the paint at the same shear.

The methyl trihydrogenated tallow ammonium bentonite is, therefore, a distinct improvement over the conventionally employed organoclay in terms of ease of dispersion, viscosity development and sag control properties.

EXAMPLE 4

Procedure for Low Shear Post Addition of Benzyl Trioleyl Ammonium Bentonite into a Finished Alkyd Enamel Paint (Aliphatic Solvent Type)

The procedures of Example 2 were used in this example except that the organoclay thickener used was the benzyl trioleyl ammonium bentonite having an M.E. ratio of 109.6 instead of benzyl trihydrogenated tallow ammonium bentonite. All other ingredients and amounts were exactly the same as those given in Table II.

The results in Table V show that the benzyl trioleyl ammonium bentonite, post-added to the paint at moderately low shear, imparts similar viscosity and sag to the paint as the conventionally employed dimethyl dihydrogenated tallow ammonium bentonite when incorporated into the paint at a significantly higher shear condition. The dimethyl dihydrogenated tallow ammonium bentonite, when incorporated under the low shear condition, gave significantly poorer viscosity build and sag resistance compared to the benzyl trioleyl ammonium bentonite incorporated at the same shear.

EXAMPLE 5

Procedure for the Low Shear Post Addition of Methyl Trioleyl Ammonium Bentonite into a Finished Alkyd Enamel Paint (Aliphatic Solvent Type)

The procedures used in Example 2 were used in this example except that the methyl trioleyl ammonium bentonite having and ME ratio of 108.6 was used instead of the benzyl trihydrogenated tallow ammonium bentonite. All other ingredients and amounts were exactly the same as those listed in Table II.

The results in Table VI show an improvement for the methyl trioleyl ammonium bentonite in viscosity build over the dimethyl dihydrogenated tallow ammonium bentonite, when post-added to the test paint, at shear conditions that are lower than normally used to incorporate the conventional organophilic clay into the paint system. Thus the methyl trioleyl ammonium bentonite is an improvement over the conventional employed organoclay in viscosity build at the low shear condition.

EXAMPLE 6

Procedure for Low Shear Post Addition of Benzyl Tristearyl Ammonium Bentonite into a Finished Alkyd Enamel Paint (Aromatic Solvent Type)

The proceedings used in Example 2 were used in this example except that the benzyl tristearyl ammonium bentonite having an ME ratio of 112.8 was used instead of the benzyl trihydrogenated tallow ammonium bentonite. All other ingredients and amounts were exactly the same as those listed in Table II.

The results in Table VII show that the benzyl tristearyl ammonium bentonite, post-added to the paint at moderately low shear, imparts superior viscosity, and sag resistance to the paint as compared to the conventionally employed dimethyl dihydrogenated tallow ammonium bentonite when incorporated into the paint at a much higher shear rate. In addition, the dimethyl dihydrogenated tallow ammonium bentonite, when incorporated into the paint at the low shear condition, is definitely inferior in dispersibility, viscosity build and sag resistance properties compared to the benzyl tristearyl ammonium bentonite incorporated into the paint at the same shear. These data show the benzyl tristearyl ammonium bentonite to be a distinct improvement over the conventionally employed organoclay in both viscosity build and sag resistance properties.

EXAMPLE 7

Procedure for Low Shear Post Addition of Methyl Tristearyl Ammonium Bentonite into a Finished Alkyd Enamel Paint (Aromatic Solvent Type)

The procedures used in Example 2 were used in this example except that methyl tristearyl ammonium bentonite having an ME ratio of 114.3 was used instead of the benzyl trihydrogenated tallow ammonium bentonite All other ingredients and amounts were exactly the same as those listed in Table II.

The results in Table VIII show a significant improvement for the methyl tristearyl ammonium bentonite in viscosity build over the dimethyl dihydrogenated tallow ammonium bentonite, when post-added to the test paint, at shear conditions lower than those normally used to incorporate the conventional organophilic clay into the paint system. This higher viscosity build shows that the methyl tristearyl ammonium bentonite is an improvement over the conventional organoclay at the lower shear conditions.

EXAMPLE 8

Procedures for Low Shear Post Addition of Methyl Trihydrogenated Tallow Ammonium Bentonite into a Finished Alkyd Baking Enamel (Aromatic Solvent Type)

The procedures of Example 2 were used in this example except that the alkyd baking enamel described below in Table IX was the test system instead of the alkyd air dry enamel and the comparative organoclay used was dimethyl dihydrogenated tallow ammonium hectorite instead of the dimethyl dihydrogenated tallow ammonium bentonite. In addition, the exact weights of the alkyd bake enamel, organoclays and in the case of the comparative thickener, polar solvent activator, were different from those used in Example 2. Specifically, in this example 626 grams of the test alkyd was used for the post-addition of 5.6 grams of the organophilic clays and 1.8 grams (2.3 cc) of the polar solvent activator.

The results listed on Table X indicate that the methyl trihydrogenated tallow ammonium bentonite represents a definite improvement over the conventionally employed dimethyl dihydrogenated tallow ammonium hectorite showing superior ease of dispersion, viscosity build and sag control properties when post-added to the test paint at shear conditions that are lower than normally used to commercially incorporate the comparator organophilic clay into the paint system.

EXAMPLE 9

Procedure for Low Shear Post Addition of Benzyl Trioleyl Ammonium Bentonite into an Alkyd Solution in Xylene The benzyl trioleyl ammonium bentonite was post-added under low shear conditions into a short oil alkyd resin dissolved in xylene. For comparison, a dimethyl dihydrogenated tallow ammonium hectorite was also post-added to the resin solution at the same shear conditions as the test organophilic clay; however, in this case a mixture of 95% methanol and 5% water was used as a polar solvent activator for the organoclay.

Specifically, 392 grams of resin solution (see Table XI), not containing a rheological additive, was weighted into a derimmed circular quart can which measures 4 inches in diameter and 4⅝ inches in height. The paint is agitated using a 1 HP Premier dispersator equipped with a 1¾ inch diameter saw toothed Cowles blade. The blade was positioned in the resin at the center of the quart can at a height such that the bottom of the blade is ½ inch above the bottom surface of the can. The shaft speed is held constant at 3000 rpm. 8.0 grams of the benzyl trioleyl ammonium bentonite is slowly shifted into the swirling resin. In the case of the dimethyl dihydrogenated tallow hectorite, 2.6 grams (3.2 cc) of a mixture of 95% methanol and 5% water is also added to the resin exactly on minute after the addition of the organoclay is completed. This polar solvent activator is injected into the paint using a 5 cc glass syringe.

The fineness of grind, viscosity and sag resistance of the resin organoclay mixture is measured exactly as described in Example 1 except that the viscosity is measured using spindle number 6 instead of spindle number 4 and the anti-sag blade used to measure the sag index is calibrated from 14 to 60 mils instead from 3 to 12 mils.

Viscosity, dispersion and sag measurements for these resin/organoclay mixtures are given in Table XII. These results indicate the improvement in viscosity build and sag resistance that is obtained when the test resin is thickened with the stir-in additive, benzyl trioleyl ammonium bentonite, compared to that obtained when the conventional organoclay is used.

EXAMPLE 10

The procedure of Example 9 was repeated except that the stir-in experimental organophilic clay utilized was methyl trioleyl ammonium bentonite instead of benzyl trioleyl ammonium bentonite.

The data listed on Table XIII indicates that the methyl trioleyl ammonium bentonite is a definite improvement over the conventionally employed organoclay in terms of imparting viscosity build and sag control to the subject test resin solution.

EXAMPLE 11

The procedure of Example 9 was repeated except that the stir-in organophilic utilized was benzyl tristearyl ammonium bentonite instead of benzyl trioleyl ammonium bentonite.

Table XIV shows that the benzyl tristearyl ammonium bentonite represents a distinct improvement over the conventionally employed organophilic clay in terms of imparting greater viscosity build and sag control to the resin test solution.

EXAMPLE 12

The procedure of Example 9 was repeated except the organophilic clay was methyl tristearyl ammonium bentonite instead of benzyl trioleyl ammonium bentonite.

Table XV indicates the superior viscosity build and sag control of the resin solution thickened with the methyl tristearyl ammonium bentonite compared to that containing the conventionally employed organoclay, dimethyl dihydrogenated tallow ammonium hectorite.

TABLES I-XV

TABLE I

| Organophilic Clay | | | 4.5% Organophilic Clay 10 rpm Brookfield Viscosity, cp. | | |
|---|---|---|---|---|---|
| Quaternary Ammonium Chloride | Clay | ME Ratio | 0% Water 0.5 Minutes | 0.12% Water 6 Minutes | 9 Minutes |
| Methyl benzyl dihydrogenated tallow | Hectorite | 87.5 | 480 | —(2) | 1,000 |
| Methyl benzyl dihydrogenated tallow | Hectorite | 92.4 | 480 | — | 2,000 |
| Methyl benzyl dihydrogenated tallow | Hectorite | 97.2 | 560 | — | 9,000 |
| Methyl benzyl dihydrogenated tallow | Hectorite | 99.1 | 560 | — | 11,200 |
| Methyl benzyl dihydrogenated tallow | Hectorite | 99.7 | — | 11,200 | — |
| Methyl benzyl dihydrogenated tallow | Hectorite | 103.8 | 7,000 | 48,400 | 58,400 |
| Methyl benzyl dihydrogenated tallow | Hectorite | 104.3 | — | 35,200 | 50,000 |
| Methyl benzyl dihydrogenated tallow | Hectorite | 106.5 | 6,720 | 48,000 | — |
| Methyl benzyl dihydrogenated tallow | Hectorite | 108.0 | 2,040 | 49,600 | 64,400 |

TABLE I-continued

| Organophilic Clay | | | 4.5% Organophilic Clay 10 rpm Brookfield Viscosity, cp. | | |
|---|---|---|---|---|---|
| | | | 0% Water | 0.12% Water | |
| Quaternary Ammonium Chloride | Clay | ME Ratio | 0.5 Minutes | 6 Minutes | 9 Minutes |
| Methyl benzyl dihydrogenated tallow | Hectorite | 110.5 | 1,040 | 33,000 | 46,800 |
| Methyl benzyl dihydrogenated tallow | Hectorite | 112.9 | 890 | 44,000 | 67,600 |
| Methyl benzyl dihydrogenated tallow | Hectorite | 115.0 | 3,400 | 33,600 | 34,800 |
| Methyl benzyl dihydrogenated tallow | Hectorite | 117.9 | — | 21,000 | — |
| Methyl benzyl dihydrogenated tallow | Hectorite | 124.9 | — | 13,000 | — |
| Methyl benzyl dihydrogenated tallow | Bentonite | 91.5 | 400 | 400 | — |
| Methyl benzyl dihydrogenated tallow | Bentonite | 96.9 | — | 3,200 | — |
| Methyl benzyl dihydrogenated tallow | Bentonite | 102.6 | 2,880 | 36,800 | 44,000 |
| Methyl benzyl dihydrogenated tallow | Bentonite | 106.0 | 9,280 | 51,200 | 50,000 |
| Methyl benzyl dihydrogenated tallow | Bentonite | 111.0 | 20,000 | 30,400 | 25,000 |
| Methyl benzyl dihydrogenated tallow | Bentonite | 114.4 | — | 15,500 | — |
| Methyl benzyl dihydrogenated tallow | Bentonite | 120.2 | — | 14,600 | — |
| Methyl benzyl dihydrogenated tallow | Bentonite | 123.6 | — | 6,800 | — |
| Methyl Trihydrogenated tallow | Hectorite | 95.8 | — | 4,800 | — |
| Methyl Trihydrogenated tallow | Hectorite | 101.9 | — | 4,400 | — |
| Methyl Trihydrogenated tallow | Hectorite | 108.5 | 640 | 3,320 | — |
| Methyl Trihydrogenated tallow | Hectorite | 118.5 | — | 7,400 | — |
| Benzyl Trihydrogenated tallow | Hectorite | 95.5 | — | 5,000 | — |
| Benzyl Trihydrogenated tallow | Hectorite | 101.4 | — | 4,800 | — |
| Benzyl Trihydrogenated tallow | Hectorite | 107.9 | 1,480 | 4,000 | — |
| Benzyl Trihydrogenated tallow | Hectorite | 119.9 | — | 5,600 | — |
| Dimethyl dihydrogenated tallow | Hectorite | 95.2 | — | 3,400 | — |
| Dimethyl dihydrogenated tallow | Hectorite | 102.9 | 480 | 3,400 | — |
| Dimethyl dihydrogenated tallow | Hectorite | 108.8 | 480 | 12,500 | — |
| Dimethyl dihydrogenated tallow | Hectorite | 117.0 | 440 | 400 | — |
| Dimethyl benzyl hydrogenated tallow | Hectorite | 117 | — | — | 560 |
| Dimethyl benzyl hydrogenated tallow | Bentonite | 96.6 | — | 400 | — |
| Dimethyl benzyl hydrogenated tallow | Bentonite | 101.9 | — | 200 | — |
| Dimethyl benzyl hydrogenated tallow | Bentonite | 111.1 | — | 400 | — |
| Dimethyl benzyl hydrogenated tallow | Bentonite | 120.5 | — | 400 | — |
| Methyl benzyl dihydrogenated tallow | (1) | 111.0 | 8,800 | 41,600 | 41,800 |

(1) 1:1 weight ratio of hectorite and bentonite
(2) — indicates the data was not obtained

TABLE II

ADD IN THE FOLLOWING ORDER WITH MIXING

| INGREDIENTS | GENERIC NAME | MANUFACTURER | BLANK (NO THICKENER) POUNDS | CONTROL NORMAL PROCESSING (HIGH SHEAR) POUNDS | EXPERIMENTAL LOW SHEAR PROCESSING (POST ADDITION) POUNDS |
|---|---|---|---|---|---|
| MILLBASE | | | | | |
| Aroplaz 1266M70 | Long Oil Soya Alkyd Resin Solution (70% N.V.) | Spencer Kellog Div. of Textron, Inc. | 66.1 | 66.1 | 66.1 |
| Mineral Spirits 663 | Aliphatic Hydrocarbon | Union Oil Company of California | 66.7 | 66.7 | 66.7 |
| Rheological Additive | Dimethyl dihydrogenated tallow ammonium bentonite | NL Industries, Inc. | — | 10 | — |
| Methanol/Water, 95/5 | — | — | — | 3.3 | — |
| TITANOX 2020 | Titanium Dioxide Rutile | NL Industries, Inc. | 240.1 | 240.1 | 240.1 |
| Atomite | Calcium Carbonate Natural Ground | Thompson, Weinmann & Co. | 191.3 | 191.3 | 191.3 |
| GRIND AT HIGH SPEED - 5400 RPM FOR 15 MINUTES | | | | | |
| LET DOWN - ADD IN ORDER LISTED WITH MIXING AT 2,000 RPM | | | | | |
| Aroplaz 1266 M70 | Long Oil Soya Alkyd Resin Solution (70% N.V.) | Spencer Kellogg Div. of Textron, Inc. | 241.4 | 241.4 | 241.4 |
| Aroflat 3113P30 | Thixotropic Alkyd | Spencer Kellogg | 191.3 | 191.3 | 191.3 |
| Mineral Spirits 663 | Aliphatic Hydrocarbon | Union Oil Company of California | 46.8 | 46.8 | 46.8 |
| Paint Drier | 6% Cobalt Naphthenate | Tenneco Chemical, Inc. | 1.8 | 1.8 | 1.8 |
| Paint Drier | 4% Calcium Naphthenate | Tenneco Chemical, Inc. | 8.6 | 8.6 | 8.6 |
| Exkin #2 | Oxime Antiskin Agent | Tenneco Chemical, Inc. | 1.0 | 1.0 | 1.0 |
| MIX AT 3000 RPM | | | | | |
| Stir-In Thickener | Benzyl Trihydrogenated Tallow Ammonium Bentonite | Experimental | — | — | 10.0 |
| | | TOTALS | 1055.1 | 1068.4 | 1065.1 |

TABLE VIII

| ORGANOPHILIC CLAY | SHEAR CONDITION | DISPERSION | VISCOSITY CPS | SAG |
|---|---|---|---|---|
| Methyl tristearyl ammonium bentonite | Cowles @ 3000 rpm | 0.0 | 1120 | 4 |
| Dimethyl dihydrogenated tallow ammonium bentonite | Cowles @ 3000 rpm | 0.0 | 480 | 3 |
| Dimethyl dihydrogenated tallow ammonium bentonite | Cowles @ 5400 rpm | 6.0 | 1280 | 6 |
| Blank Paint (no organophilic clay) | Cowles @ 5400 rpm | 6.0 | 350 | 2 |

TABLE IX

CHANGE TO ONE QUART PEBBLE MILL

| INGREDIENTS | GENERIC NAME | MANUFACTURER | BLANK (NO THICKENER) POUNDS | REGULAR PROCESSING (HIGH SHEAR) POUNDS | LOW SHEAR PROCESSING (POST ADDITION) POUNDS |
|---|---|---|---|---|---|
| MILLBASE - ADD IN THE FOLLOWING ORDER | | | | | |
| Duraplex 12-808 | Short oil unmodified alkyd (60% N.V.) | Reichhold Chemical, Inc. | 215 | 215 | 215 |
| Xylene | — | Shell Chemical Co | 146 | 146 | 146 |
| Rheological Additive | Dimethyl dihydrogenated tallow ammonium hectorite | NL Industries, Inc. | — | 10 | — |
| Methanol/Water, 95/5 | — | — | — | 3.3 | — |
| TITANOX 2020 | Rutile Titanium Dioxide | NL Industries, Inc. | 355 | 355 | 355 |
| PEBBLE MILL FOR 16 HOURS | | | | | |
| LET DOWN - ADD TO PEBBLE MILL IN ORDER SHOWN | | | | | |
| Duraplex 12-808 | Short oil unmodified alkyd (60% N.V.) | Reichhold Chemical, Inc. | 198 | 198 | 198 |
| Uformite 27-809 | Melamine formaldehyde Resin (50% N.V.) | Reichhold Chemical, Inc. | 177 | 177 | 177 |
| MIX FOR ½ HOUR IN PEBBLE MILL BEFORE CANNING OFF | | | | | |
| Stir-in Thickener | Methyl trihydrogenated tallow ammonium bentonite | experimental | — | — | 10 |
| MIX INTO FINISHED BLANK PAINT USING COWLES AT 3000 RPM | | | | | |
| | | TOTALS | 736 | 749.3 | 746 |

TABLE X

| ORGANOPHILIC CLAY | SHEAR CONDITION | DISPERSION 15 MIN. | VISCOSITY CPS | SAG MILS |
|---|---|---|---|---|
| Methyl trihydrogenated tallow ammonium bentonite | Cowles @ 3000 rpm | 4.0 NS | 2550 | 16 |
| Dimethyl dihydrogenated tallow ammonium hectorite | Cowles @ 3000 rpm | 0.0 NS | 480 | 5 |
| Dimethyl dihydrogenated tallow ammonium hectorite | Cowles @ 5400 rpm (normal processing) | 5.5 NS | 1500 | 9 |
| Blank Paint (no organophilic clay) | Cowles @ 5400 rpm (normal processing) | 5.5 NS | 400 | 3 |

TABLE XI

| INGREDIENTS | GENERIC NAME | MANUFACTURER | CONVENTIONAL ORGANOCLAY GRAMS | STIR-IN ORGANOCLAY GRAMS |
|---|---|---|---|---|
| Duraplex 12-808 | Short oil unmodified alkyd (60% N.V.) | Reichhold Chemical, Inc. | 392 | 392 |
| Rheological Additive | Dimethyl dihydrogenated tallow ammonium hectorite | NL Industries | 8 | — |
| Methanol/Water, 95/5 | — | — | 2.6 | — |
| Stir-In Thickener | Benzyl trioleyl ammonium bentonite | Experimental | — | 8 |

TABLE III

| ORGANOPHILIC CLAY | SHEAR CONDITION | DISPERSION | VISCOSITY CPS | SAG |
|---|---|---|---|---|
| Benzyl trihydrogenated tallow ammonium bentonite | Cowles @ 3000 rpm | 6.0 | 1300 | 6 |
| Dimethyl dihydrogenated tallow ammonium bentonite | Cowles @ 3000 rpm | 0.0 | 480 | 3 |
| Dimethyl dihydrogenated tallow ammonium bentonite | Cowles @ 5400 rpm (normal processing) | 6.0 | 1280 | 6 |
| Blank Paint (no organophilic clay) | Cowles @ 5400 rpm | 6.0 | 350 | 2 |

TABLE IV

| ORGANOPHILIC CLAY | SHEAR CONDITION | DISPERSION | VISCOSITY CPS | SAG |
|---|---|---|---|---|
| Methyl trihydrogenated tallow ammonium bentonite | Cowles @ 3000 rpm | 5.0 | 1650 | 7 |
| Dimethyl dihydrogenated tallow ammonium bentonite | Cowles @ 3000 rpm | 0.0 | 480 | 3 |
| Dimethyl dihydrogenated tallow ammonium bentonite | Cowles @ 5400 rpm (normal processing) | 6.0 | 1280 | 6 |
| Blank Paint (no organophilic clay) | Cowles @ 5400 rpm | 6.0 | 350 | 2 |

TABLE V

| ORGANOPHILIC CLAY | SHEAR CONDITION | DISPERSION | VISCOSITY CPS | SAG |
|---|---|---|---|---|
| Benzyl trioleyl ammonium bentonite | Cowles @ 3000 rpm | 0.0 | 1400 | 5 |
| Dimethyl dihydrogenated tallow ammonium bentonite | Cowles @ 3000 rpm | 0.0 | 480 | 3 |
| Dimethyl dihydrogenated tallow ammonium bentonite | Cowles @ 5400 rpm (normal processing) | 6.0 | 1280 | 6 |
| Blank Paint (no organophilic clay) | Cowles @ 5400 rpm | 6.0 | 350 | 2 |

TABLE VI

| ORGANOPHILIC CLAY | SHEAR CONDITION | DISPERSION | VISCOSITY CPS | SAG |
|---|---|---|---|---|
| Methyl trioleyl ammonium bentonite | Cowles @ 3000 rpm | 0.0 | 720 | 3 |
| Dimethyl dihydrogenated tallow ammonium bentonite | Cowles @ 3000 rpm | 0.0 | 480 | 3 |
| Dimethyl dihydrogenated tallow ammonium bentonite | Cowles @ 5400 rpm | 6.0 | 1280 | 6 |
| Blank Paint (no organophilic clay) | Cowles @ 5400 rpm | 6.0 | 350 | 2 |

TABLE VII

| ORGANOPHILIC CLAY | SHEAR CONDITION | DISPERSION | VISCOSITY CPS | SAG |
|---|---|---|---|---|
| Benzyl tristearyl ammonium bentonite | Cowles @ 3000 rpm | 1.5 | 1800 | 7 |
| Dimethyl dihydrogenated tallow ammonium bentonite | Cowles @ 3000 rpm | 0.0 | 480 | 3 |
| Dimethyl dihydrogenated tallow ammonium bentonite | Cowles @ 5400 rpm | 0.0 | 1280 | 6 |
| Blank Paint (no organophilic clay) | Cowles @ 5400 rpm | 6.0 | 350 | 2 |

TABLE XI-continued

| INGREDIENTS | GENERIC NAME | MANUFACTURER | CONVENTIONAL ORGANOCLAY | STIR-IN ORGANOCLAY |
|---|---|---|---|---|
| | | | GRAMS | |
| | Mix into Resin Solution using Cowles at 3000 rpm. | | | |
| TOTALS | | | 402.6 | 400.0 |

TABLE XII

| ORGANOPHILIC CLAY | SHEAR CONDITION | DISPERSION 15 MIN. | VISCOSITY CPS | SAG MILS |
|---|---|---|---|---|
| Benzyl trioleyl ammonium bentonite | Cowles @ 3000 rpm | 0.0 NS | 31000 | 30 |
| Dimethyl dihydrogenated tallow ammonium hectorite | Cowles @ 3000 rpm | 0.0 NS | 9620 | 16 |
| Blank Paint (no organophilic clay) | — | 8.0 NS | 5760 | 12 |

TABLE XIII

| ORGANOPHILIC CLAY | SHEAR CONDITION | DISPERSION | VISCOSITY CPS | SAG MILS |
|---|---|---|---|---|
| Methyl trioleyl ammonium bentonite | Cowles @ 3000 rpm | 0.0 NS | 19300 | 25 |
| Dimethyl dihydrogenated tallow ammonium hectorite | Cowles @ 3000 rpm | 0.0 NS | 9620 | 16 |
| Blank Paint (no organophilic clay) | — | 8.0 NS | 5760 | 12 |

TABLE XIV

| ORGANOPHILIC CLAY | SHEAR CONDITION | DISPERSION 15 MIN. | VISCOSITY CPS | SAG MILS |
|---|---|---|---|---|
| Benzyl tristearyl ammonium bentonite | Cowles @ 3000 rpm | 0.0 NS | 30000 | 30 |
| Dimethyl dihydrogenated tallow ammonium hectorite | Cowles @ 3000 rpm | 0.0 NS | 9620 | 16 |
| Blank Paint (no organophilic clay) | Cowles @ 3000 rpm | 8.0 NS | 5760 | 12 |

TABLE XV

| ORGANOPHILIC CLAY | SHEAR CONDITION | DISPERSION | VISCOSITY CPS | SAG |
|---|---|---|---|---|
| Methyl tristearyl ammonium bentonite | Cowles @ 3000 rpm | 0.0 | 20000 | 20 |
| Dimethyl dihydrogenated tallow ammonium hectorite | Cowles @ 3000 rpm | 0.0 | 9620 | 16 |
| Blank Paint (no organophilic clay) | Cowles @ 3000 rpm | 8.0 NS | 5760 | 12 |

The invention being thus described, it will be obvious that the same may be varied in many ways. Such variations are not to be regarded as a departure from the spirit and scope of the invention and all such modifications are intended to be included within the scope of the following claims:

What is claimed is:

1. An organophilic clay gellant having enhanced dispersibility in organic systems and capable of increasing the viscosity of a liquid organic system without the addition of a polar organic dispersant, comprising the reaction product of a methyl or benzyl trialkyl ammonium compound, wherein the alkyl group contains 14 to 20 carbon atoms, and a bentonite clay having a cation exchange capacity of at least 75 milliequivalents per 100 grams of said clay, and wherein the amount of said ammonium compound is from 100 to 120 milliequivalents per 100 grams of said clay, 100% active clay basis.

2. The composition of claim 1 wherein the smectite-type clay is sodium bentonite.

3. The composition of claim 1 wherein the organophilic clay gellant is prepared from a reaction product selected from the group consisting of methyl trihydrogenated tallow ammonium chloride, and benzyl trihydrogenated tallow ammonium chloride.

4. The composition of claim 1 wherein the smectite-type clay contains from about 10% to about 50% by weight non-clay impurities.

5. The composition of claim 1 wherein the compound contains 20 to 35% alkyl groups having 16 carbon atoms and 60 to 75% alkyl groups having 18 carbon atoms.

6. An organophilic clay gellant having enhanced dispersibility in organic systems comprising the reaction product of an ammonium compound having the formula:

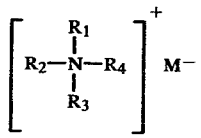
wherein $R_1$ is $CH_3$ or $C_6H_5CH_2$; $R_2$, $R_3$ and $R_4$ are alkyl groups containing 14 to 20 carbon atoms, and mixtures thereof, based on 100% and where $M^-$ is selected from the group consisting of $Cl^-$, $Br^-$, $NO_2^-$, $OH^-$, and $C_2H_3O_2^-$, and sodium bentonite, and wherein the amount of said ammonium compound is from 100 to 120 milliequivalents per 100 grams of said clay, 100% active clay basis.
* * * * *